(12) United States Patent
Matsuura

(10) Patent No.: US 12,260,592 B2
(45) Date of Patent: Mar. 25, 2025

(54) IMAGE PROCESSING DEVICE, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Takahiro Matsuura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 18/054,087

(22) Filed: Nov. 9, 2022

(65) Prior Publication Data

US 2023/0154046 A1  May 18, 2023

(30) Foreign Application Priority Data

Nov. 15, 2021  (JP) .................. 2021-185893

(51) Int. Cl.
  *G06T 7/80*  (2017.01)
(52) U.S. Cl.
  CPC ...................... *G06T 7/80* (2017.01)
(58) Field of Classification Search
  CPC .................. G06T 7/80; G06T 5/92
  USPC ..................................... 348/222.1
  See application file for complete search history.

(56) References Cited

U.S. PATENT DOCUMENTS

| | | | | |
|---|---|---|---|---|
| 9,514,508 B2* | 12/2016 | Ballestad | ............... | G06T 11/001 |
| 9,661,299 B2* | 5/2017 | Stauder | ................... | H04N 13/15 |
| 11,172,144 B2* | 11/2021 | Savoie | .................. | H04N 23/76 |
| 11,637,998 B1* | 4/2023 | Pieper | .................. | H04N 23/85 |
| | | | | 348/207.99 |
| 2014/0333660 A1* | 11/2014 | Ballestad | ............... | G06T 11/001 |
| | | | | 345/589 |
| 2017/0078706 A1* | 3/2017 | Van Der Vleuten | ...... | G06T 5/92 |
| 2018/0367819 A1* | 12/2018 | Van Der Vleuten | ...... | G06T 9/00 |
| 2019/0208173 A1* | 7/2019 | Kadu | .................. | H04N 19/154 |
| 2019/0253637 A1* | 8/2019 | Savoie | .................. | H04N 23/76 |

FOREIGN PATENT DOCUMENTS

| | | |
|---|---|---|
| JP | H08-163384 A | 6/1996 |
| JP | 3990971 B2 | 10/2007 |

* cited by examiner

*Primary Examiner* — Pritham D Prabhakher
(74) *Attorney, Agent, or Firm* — Canon U.S.A., Inc. IP Division

(57) ABSTRACT

A processing device comprises a processing unit configured to derive pixel values corresponding to respective parameters based on a pixel value of one captured image among a plurality of images captured by a capturing device with different parameters and a parameter corresponding to a respective one of the plurality of captured images, and an obtainment unit configured to obtain a characteristic in the capturing device based on a pixel value of respective one of the plurality of captured images and the derived pixel values.

16 Claims, 8 Drawing Sheets

IMAGE PROCESSING DEVICE, IMAGE PROCESSING METHOD, AND NON-TRANSITORY COMPUTER-READABLE STORAGE MEDIUM

BACKGROUND

Technical Field

The aspect of the embodiments relates to a technique for obtaining a tone conversion characteristic of an image capturing device.

Description of the Related Art

In the field of image production, the tasks of shooting using a plurality of digital cameras and then producing a single moving image by editing are carried out. At that time, digital cameras of different manufacturers and models are used depending on the application.

Conventionally, color matching between digital cameras of different manufacturers and models is performed manually by a skilled person; however, there are issues, such as that the work takes time and it is difficult to match colors with high accuracy.

Japanese Patent No. 3990971 discloses a technique for matching a captured value of a digital camera to a measured value of a chart. If this technique is applied—it becomes possible to match colors between different digital cameras by, for example, performing matching using a captured value of another digital camera instead of the measured value. In order to match colors with high accuracy, it is important to make a relationship between a pixel value of a digital camera and a luminance of an original subject linear in advance. For this, a gamma characteristic of the camera is estimated and its inverse gamma correction is performed.

Meanwhile, Japanese Patent Laid-Open No. H8-163384 discloses a technique in which a result of output of a tone pattern is read by color separation and, from RGB values of a result of color separation, a gamma characteristic of a printer is estimated.

As described above, in Japanese Patent Laid-Open No. H8-163384, a result of outputting a tone pattern is read by color separation and, from RGB values of a result of color separation, a gamma characteristic of a printer is estimated. In contrast, a digital camera cannot intentionally output a tone pattern. Therefore, with the method disclosed in Japanese Patent Laid-Open No. H8-163384, it is impossible to estimate a gamma characteristic of a digital camera, and in a state in which inverse gamma correction is not performed, it is impossible, in subsequent color matching, to perform matching with high accuracy.

SUMMARY

According to the first aspect of the embodiments, there is provided a processing device comprising: a processing unit configured to derive pixel values corresponding to respective parameters based on a pixel value of one captured image among a plurality of images captured by a capturing device with different parameters and a parameter corresponding to a respective one of the plurality of captured images; and an obtainment unit configured to obtain a characteristic in the capturing device based on a pixel value of respective one of the plurality of captured images and the derived pixel values.

According to the second aspect of the embodiments, there is provided a processing method performed by a processing device, the method comprising: deriving pixel values corresponding to respective parameters based on a pixel value of one captured image among a plurality of images captured by a capturing device with different parameters and a parameter corresponding to a respective one of the plurality of captured images; and obtaining a characteristic in the capturing device based on a pixel value of respective one of the plurality of captured images and the derived pixel values.

According to the third aspect of the embodiments, there is provided a non-transitory computer-readable storage medium storing a computer program causing a computer to perform a method comprising: deriving pixel values corresponding to respective parameters based on a pixel value of one captured image among a plurality of images captured by a capturing device with different parameters and a parameter corresponding to a respective one of the plurality of captured images; and obtaining a characteristic in the capturing device based on a pixel value of respective one of the plurality of captured images and the derived pixel values.

Further features of the disclosure will become apparent from the following description of exemplary embodiments with reference to the attached drawings.

DESCRIPTION OF THE EMBODIMENTS

Figure 1:
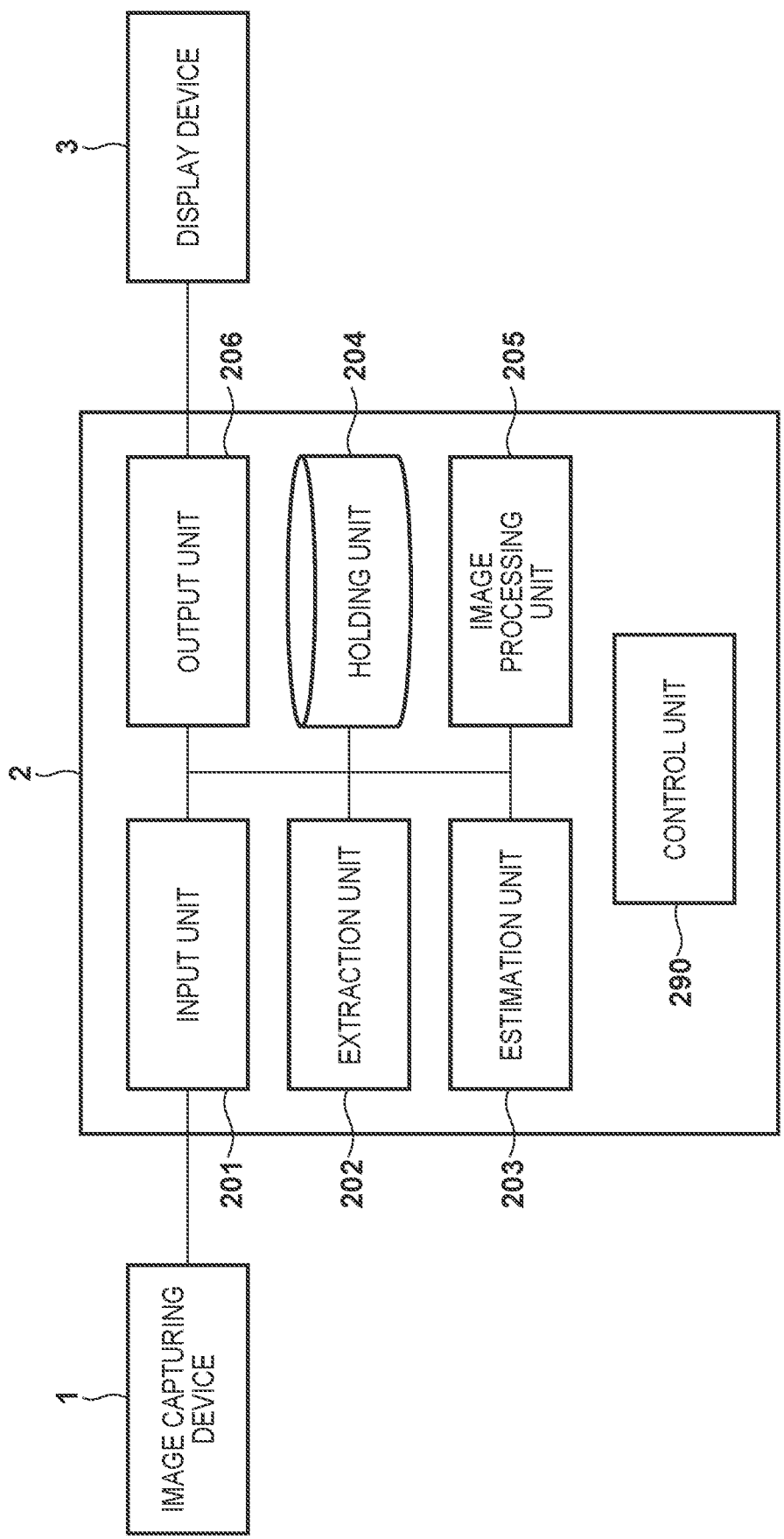
FIG. 1 is a block diagram illustrating an example of a functional configuration of a system.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

In the present embodiment, a description will be given for an example of an image processing device that obtains, based on a pixel value in each of images captured by an image capturing device and an image capturing parameter of the respective captured images, a corresponding pixel value, which corresponds to the image capturing parameter, and then obtains, based on a difference between the pixel value and the corresponding pixel value, a tone conversion characteristic in the image capturing device.

First, an example of a functional configuration of a system according to the present embodiment will be described with reference to a block diagram of FIG. 1. As illustrated in FIG. 1, the system according to the present embodiment includes an image capturing device 1, an image processing device 2, and a display device 3. Exchange of data between the respective devices—the image capturing device 1, the image processing device 2, and the display device 3—is not limited to a specific form. For example, data may be exchanged between the devices by communication over a wired or wireless network, or data may be exchanged between the devices via a memory device that can be attached to and detached from the devices.

First, the image capturing device 1 will be described. The image capturing device 1 may be a device for capturing a moving image and outputting an image of each frame in the moving image as a captured image or may be a device for periodically or irregularly capturing a still image and outputting the still image as a captured image. The image processing device 2 according to the present embodiment obtains a tone conversion characteristic of the image capturing device 1. In the present embodiment, a description will be given for a case of obtaining a gamma characteristic as a tone conversion characteristic; however, the tone conversion characteristic to be obtained is not limited to the gamma characteristic.

Next, the display device 3 will be described. The display device 3 is a device that includes a liquid crystal screen or a touch panel screen and displays various information, such as an image outputted from the image processing device 2. When the display device 3 includes a touch panel screen, the touch panel screen also functions as a user interface, and the display device 3 receives a user operation for the touch panel screen and notifies the image processing device 2 of the received user operation. Although the display device 3 and the image processing device 2 are separate devices in FIG. 1, the display device 3 and the image processing device 2 may be integrated to configure a single device.

Figure 2:
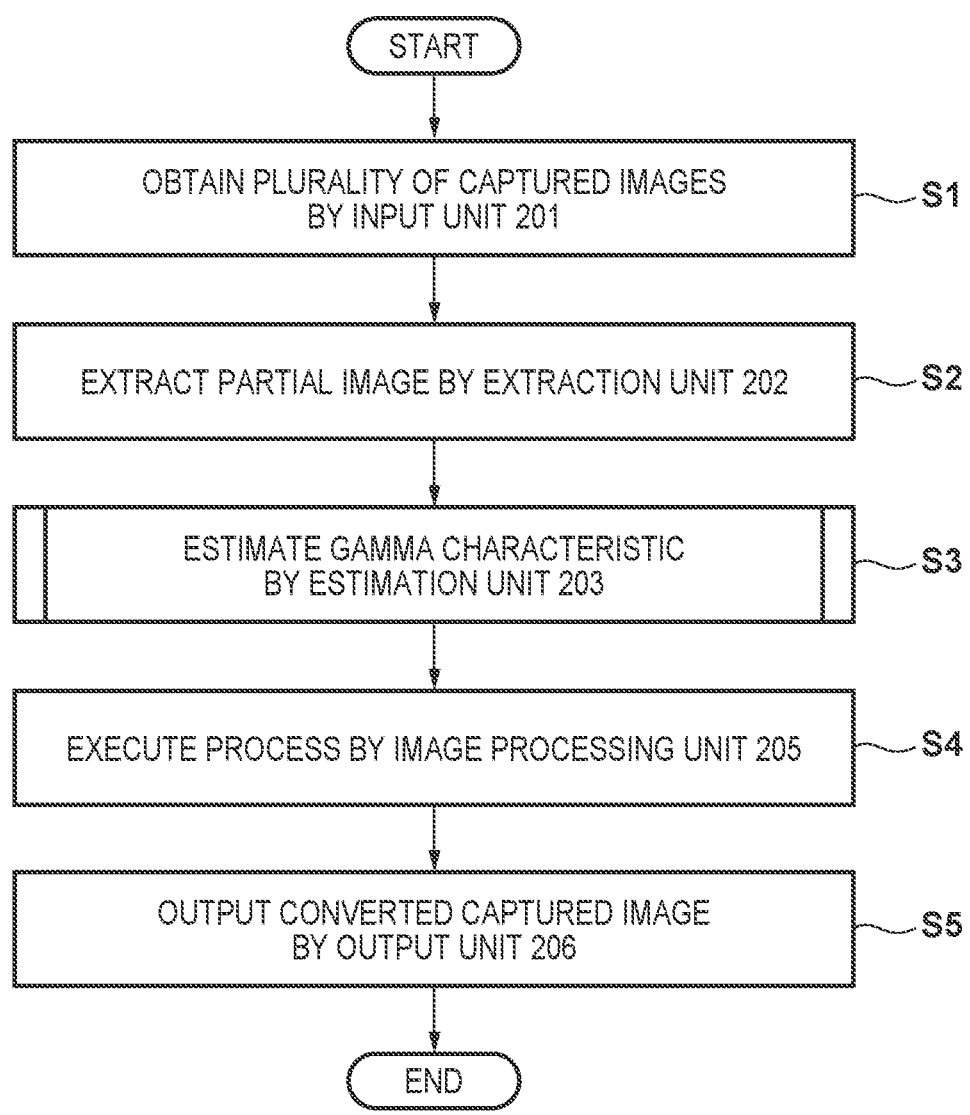
FIG. 2 is a flowchart of a process performed by an image processing device 2.

Next, the image processing device 2 will be described. The image processing device 2 is a computer device, such as a PC (personal computer), a smartphone, or a tablet terminal device. The image processing device 2 obtains (estimates) the gamma characteristic of the image capturing device 1 from a plurality of images captured by the image capturing device 1. The image processing device 2 generates a converted captured image obtained by converting an image captured by the image capturing device 1 based on the gamma characteristic and displays the generated converted captured image on a display screen of the display device 3. The processing performed by the image processing device 2 will be described in accordance with a flowchart of FIG. 2.

In step S1, the input unit 201 obtains a plurality of images captured by the image capturing device 1 while changing the image capturing parameter. That is, the plurality of captured images are images captured based on image capturing parameters that are different from each other (images captured in image capturing environments (image capturing situations) that are different from each other). In the present embodiment, a description will be given for a case where a "TV value representing a shutter speed" is used as the image capturing parameter; however, the image capturing parameter may be something other than the TV value. On the other hand, in one embodiment, the captured images are of the same subject. Here, the same does not necessarily mean completely identical, and a plurality of captured images may be such that their subjects are different from each other in part or entirely as long as they are similar to an extent at which partial images to be described later can be obtained.

The input unit 201 may obtain a plurality of images captured based on image capturing parameters that are different from each other from a server device via a wired or wireless (infrared) network or from a memory device, such as a USB memory, connected to the image processing device 2. Thus, a source from which to obtain a plurality of images captured based on image capturing parameters that are different from each other is not limited to a specific obtainment source.

In step S2, the extraction unit 202 extracts an image in an image area specified according to a user operation from each of the captured images obtained by the input unit 201 as a partial image. Here, an example of a method of extracting a partial image by the extraction unit 202 will be described.

Figure 3:
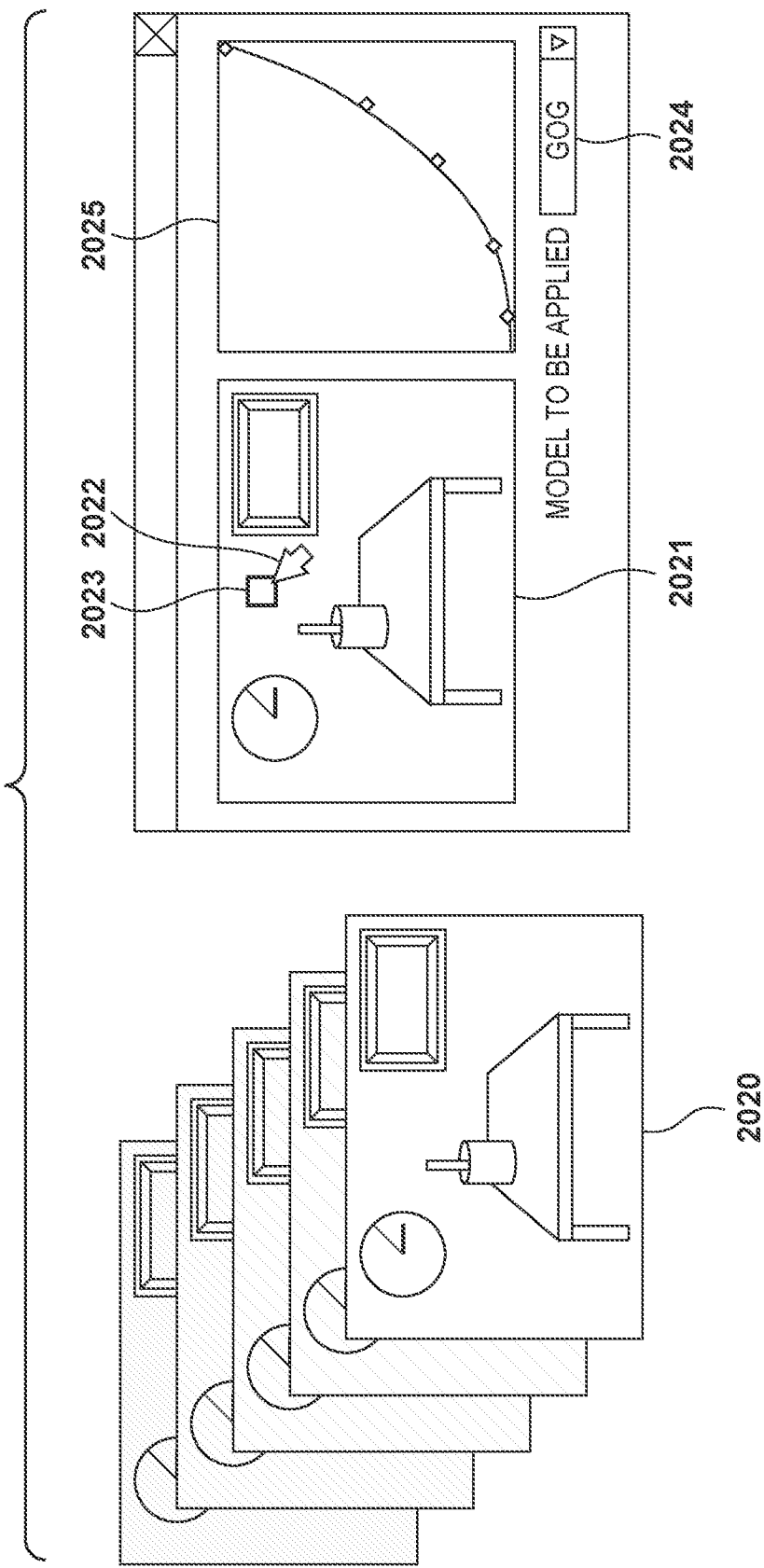
FIG. 3 is a diagram illustrating an example of a display of a GUI.

For example, a control unit 290 displays a graphical user interface (GUI) illustrated in FIG. 3 on the display screen of the display device 3. The control unit 290 sequentially displays each of a plurality of captured images 2020 obtained by the input unit 201 in a display area 2021 and receives a user operation for the captured image displayed on the display area 2021. The user operates the user interface and specifies an image area 2023 from which pixel values will be collected in the captured image displayed in the display area 2021. A method for specifying an image area is not limited to a specific method. For example, when a mouse is used as the user interface, a rectangular image area that the user specified using a cursor 2022 by a drag operation may be specified as the image area 2023. As the image area 2023, in one embodiment, an image area whose colors are as uniform as possible and close to gray are selected, for example. The extraction unit 202 extracts an image in the image area specified by the above user operation for each of the captured images as a partial image.

A configuration may be taken such that the control unit 290 lists all the captured images obtained by the input unit 201 on the display screen of the display device 3 and accepts the above user operation for each of the listed captured images. In such a case, the extraction unit 202 extracts an image in the image area specified according to the user operation for each of the listed captured images as a partial image.

Further, when the number of captured images is large, the control unit 290 displays on the display device 3 a single captured image selected according to the user operation among the plurality of captured images or selected by the control unit 290 in an appropriate manner and accepts the above user operation for the single captured image. In such a case, the extraction unit 202 obtains, from each of the plurality of captured images, an image in the image area at the same position as the image area specified according to the user operation for the single captured image as a partial image.

Figure 4:
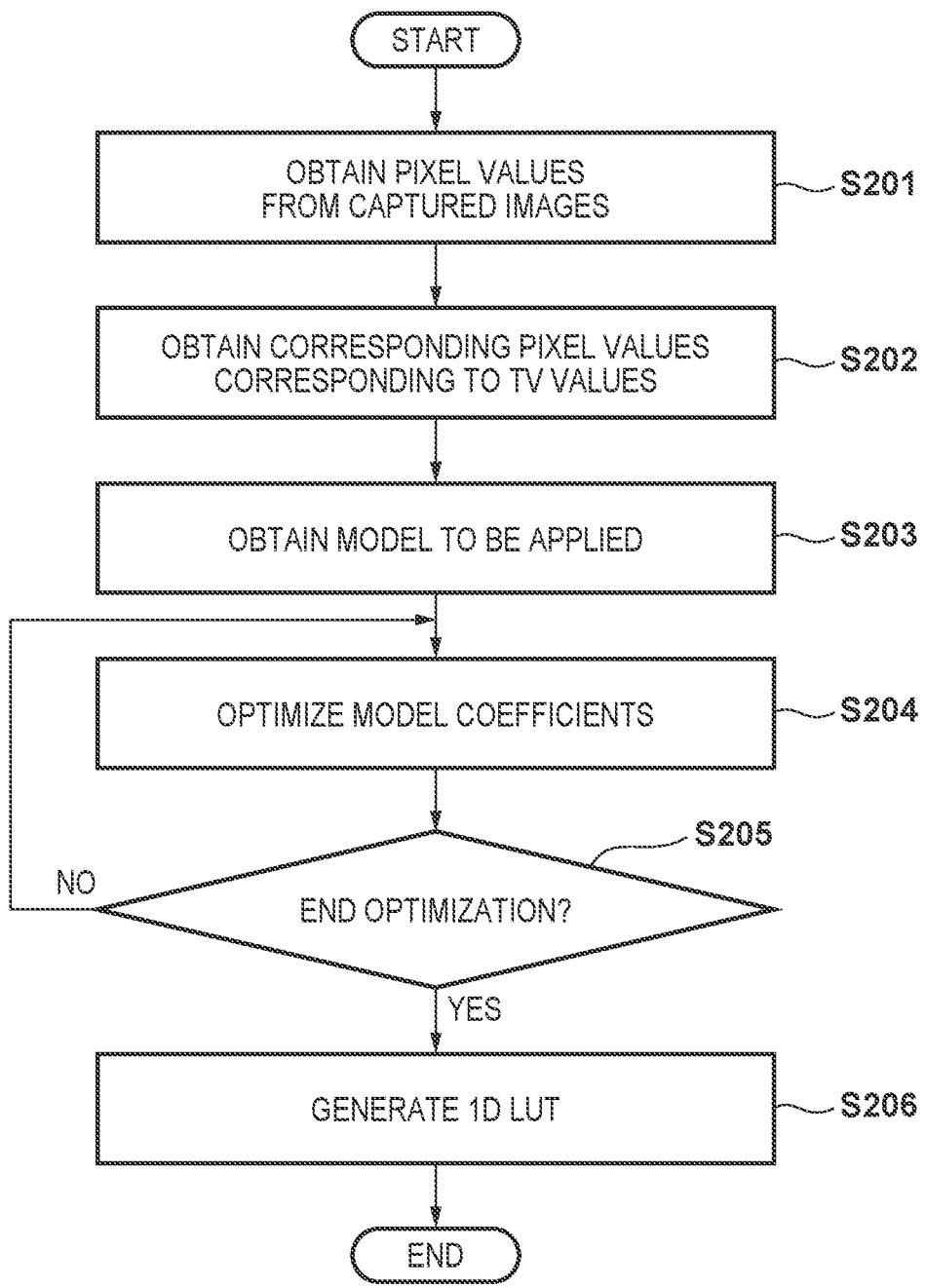
FIG. 4 is a flowchart for explaining details of a process in step S3.

In step S3, an estimation unit 203 obtains the gamma characteristic of the image capturing device 1 using partial images extracted from the respective captured images by the extraction unit 202 in step S2 and the TV values of the respective captured images. Details of the processing in step S3 will be described in accordance with the flowchart of FIG. 4. In the following, it is assumed that a captured image obtained by the input unit 201 is an RGB image that includes pixels whose values are each an R (red), G (green), or B (blue) pixel value and is expressed as I(n) (n is an integer that satisfies $1 \leq n \leq N$, where N is an integer of 2 or more).

In step S201, the estimation unit 203 first obtains an average value Rn of the R pixel values, an average value Gn of the G pixel values, and an average value Bn of the B pixel values in a partial image L(n) extracted from the captured image I(n) by the extraction unit 202. Then, the estimation unit 203 obtains a pixel value Yn in the partial image L(n) by calculating Yn=(3×Rn+6×Gn+Bn)/10. By performing such processing for n=1 to N, the estimation unit 203 can obtain the pixel value of the partial image (in the captured image) in each of the captured images obtained by the input unit 201. At this time, it is beneficial to set the pixel value of the brightest partial image to a value that is slightly smaller than the maximum value.

In step S202, the estimation unit 203 obtains the largest pixel value (the largest luminance value)=X0 among the pixel values Y1 to YN obtained in step S201, and a TV value=TV0 of a captured image, which is the source of extraction of the partial image from which the pixel value X0 has been obtained. Then, the estimation unit 203, obtains a corresponding pixel value=Xn, which corresponds to a TV value=TVn of the captured image I(n), according to the following Equation (1) using the pixel value=X0, the TV value=TV0, and the TV value=TVn of the captured image I(n).

$$Xn = X0 \times TVn/TV0 \quad (1)$$

At this time, in one embodiment, the pixel value X0 is 1 to 2% smaller than the maximum value that can be obtained. For example, if a pixel value is represented by 8 bits, the maximum value will be 255; however, X0 is a value in a range of 251 to 253.

Figure 5:
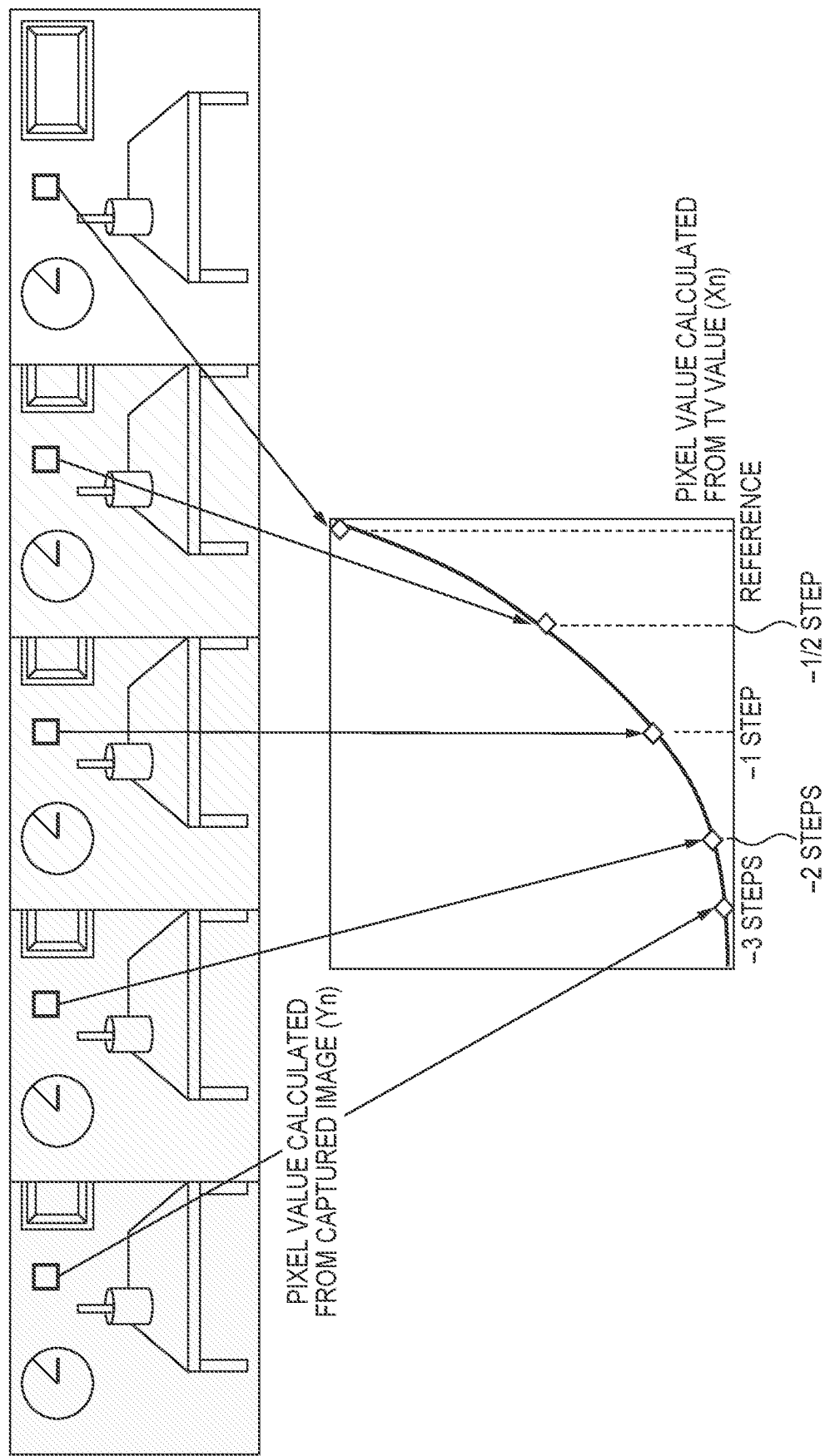
FIG. 5 is a diagram illustrating a correspondence between pixel values Y1 to YN and corresponding pixel values X1 to XN.

A correspondence relationship between the respective pixel values Y1, Y2, . . . , YN of the captured images I(1), I(2), . . . , I(N) and corresponding pixel values X1, X2, . . . , XN obtained for the respective captured images I(1), I(2), . . . , I(N) is illustrated in FIG. 5.

In step S203, the estimation unit 203 obtains a model to be applied, which is to be applied as a model for performing tone conversion (a tone conversion model). For example, when a pull-down menu 2024 for selecting a model to be applied is provided in the GUI as illustrated in FIG. 3, the user operates the interface to select one from a plurality of tone conversion models displayed in the pull-down menu 2024. The tone conversion model displayed in the pull-down menu 2024 includes, for example, a GOG (Gain, Offset, Gamma) model, a LOG gamma model, and the like. The estimation unit 203 obtains, as a model to be applied, the tone conversion model selected from the pull-down menu 2024 according to the user operation in this manner.

In step S204, the estimation unit 203 decides (optimizes) the parameters included in the model to be applied, using a data set {(X1, Y1), (X2, Y2), . . . , (XN, YN)}, thereby determining (optimizing) the model to be applied. For example, the GOG model that is applicable as the model to be applied is expressed according to the following Equation (3).

$$Y = \alpha(X+\beta)^\gamma \quad (3)$$

Here $\alpha$, $\beta$, and $\gamma$ are model coefficients, X is an input value, and Y is an output value. For example, the LOG gamma model that is applicable as the model to be applied is expressed according to the following Equation (4).

$$Y = c \log_{10}(X+b)+d \quad (4)$$

Here b, c, and d are model coefficients, X is an input value, and Y is an output value. Thus, the model to be applied includes, as parameters, model coefficients that define the model to be applied. In step S204, the estimation unit 203 decides these parameters using the data set described above. Assuming that the model to be applied is Y=f(X, p) (p is a parameter), the estimation unit 203 defines an error ΔE indicated in the following Equation (5).

$$\Delta E = \Sigma(Yn - f(Xn, p))^2 \quad (5)$$

Here Σ represents a sum for n=1 to N. Then, the estimation unit 203 obtains a parameter p that minimizes ΔE using a least squares method. For example, if the model to be applied is a GOG model, the error ΔE is defined by the following Equation (6).

$$\Delta E = \Sigma(Yn - \alpha(Xn+\beta)^\gamma)^2 \quad (6)$$

In this case, the estimation unit 203 obtains the parameters $\alpha$, $\beta$, and $\gamma$ that minimize ΔE using the least squares method. The above-described equations defining the error ΔE and method for obtaining parameter p that minimizes the error ΔE are examples and do not intend to limit the aspect of the embodiments to these.

In step S205, the estimation unit 203 determines whether a condition for ending the process (optimization process) in step S204 is satisfied. For example, when the error ΔE is equal to or less than a threshold, when the number of repetitions of the optimization process in step S204 becomes equal to or greater than a threshold, or when a rate of change of the error ΔE is less than a threshold, the estimation unit 203 determines that the condition for ending the optimization process is satisfied.

As a result of such a determination, when the condition for ending the optimization process is satisfied, the process proceeds to step S206, and when the condition for ending the optimization process is not satisfied, the process proceeds to step S204 and the optimization process is performed again.

In step S206, the estimation unit 203 obtains a one-dimensional LUT (1D LUT) representing a correspondence between an input pixel value and an output pixel value (gamma characteristic) using the model to be applied, which has been optimized by the above optimization process. For example, the estimation unit 203 obtains the output pixel values o1, o2, . . . , o1023 by inputting each of the input pixel values i1, i2, . . . , i1023 into the model to be applied. The estimation unit 203 then generates a 1D LUT in which a set of the input pixel value i1 and the output pixel value o1, a set of the input pixel value i2 and the output pixel value o2, . . . , a set of the input pixel value i1023 and the output pixel value o1023 are registered. The estimation unit 203 then stores the 1D LUT thus obtained in a holding unit 204 as data representing the gamma characteristic of the image capturing device 1.

The estimation unit 203 displays a gamma-curve based on the 1D LUT in the area 2025 the GUI of FIG. 3. More specifically, the estimation unit 203 defines a coordinate system whose horizontal axis is the input pixel value and vertical axis is the output pixel value in the area 2025. The estimation unit 203 draws a curve (gamma curve) based on coordinates (i1, o1), coordinates (i2, o2), . . . , coordinates (i1023, o1023) in the coordinate system in the area 2025.

Returning to FIG. 2, next, in step S4, the image processing unit 205 generates a converted captured image in which the pixel values of the captured image obtained from the image capturing device 1 by the input unit 201 have been converted using the 1D LUT stored in the holding unit 204. For example, the image processing unit 205 generates a converted captured image in which the pixel values (input pixel values) of the captured image obtained from the image capturing device 1 by the input unit 201 have been converted into pixel values registered in the 1D LUT as output pixel values corresponding to the input pixel values.

In step S5, an output unit 206 displays the converted captured image generated in step S4 on the display screen of the display device 3. The destination to which to output the converted captured image by the output unit 206 is not limited to the display device 3. For example, the output unit 206 may register the converted captured image in the holding unit 204 or may transmit the converted captured image to an external device via a wired or wireless (infrared) network.

Thus, according to the present embodiment, it is possible to estimate a tone conversion characteristic of a device whose tone conversion characteristic is difficult to obtain, such as the image capturing device 1 that cannot output an intended tone pattern. Thus, it is possible to perform accurate matching in, for example, color matching.

<Variation>

As described above, the above Equation (1) is an expression for obtaining the corresponding pixel value Xn in the case where the TV value is used as the image capturing parameter. However, as described above, something other than the TV value may be used as the image capturing parameter; for example, when an aperture value (AV value) is used as the image capturing parameter, the corresponding pixel value Xn may be obtained according to the following Equation (7).

$$Xn = X0 \times (AV0/AVn)^2 \qquad (7)$$

Here, AV0 is an AV value of a captured image, which is the source of extraction of the partial image from which the pixel value X0 has been obtained, and AVn is an AV value of the captured image I(n). Further, when sensitivity (ISO) is used as the image capturing parameter, the corresponding pixel value Xn may be obtained according to the following Equation (8).

$$Xn = X0 \times ISOn/ISO0 \qquad (8)$$

Here, ISO0 is an ISO value of a captured image, which is the source of extraction of the partial image from which the pixel value X0 has been obtained, and ISOn is an ISO value of the captured image I(n). Thus, by appropriately modifying the equation based on the image capturing parameter, it becomes possible to obtain a corresponding pixel value, which corresponds to the image capturing parameter.

In the first embodiment, the image area specified in accordance with the user operation with respect to the captured image is a partial image area, which a portion of the captured image; however, it may be the entire area of the captured image.

Second Embodiment

Below, including the present embodiment, a description will be given for differences from the first embodiment, and unless specifically mentioned below, the present embodiment is assumed to be the same as the first embodiment. In the first embodiment, the number of image areas that is specified in accordance with a user operation for the captured image is 1; however, it may be 2 or more in order to further improve the accuracy of tone conversion by the model to be applied (to further optimize the model to be applied). In the present embodiment, a case where two image areas (a first image area and a second image area) are specified in accordance with a user operation for each of the captured images will be described. In this case, in the present embodiment, the first image area is first used to optimize the model to be applied in the same manner as in the first embodiment. Next, in order to further optimize the optimized model to be applied, the optimized model to be applied is selected again as the model to be applied, and then the same process as in the first embodiment is performed using the second image area, thereby further optimizing the model to be applied.

In step S2 according to the present embodiment, the extraction unit 202 extracts, as a partial image, an image in each image area—the first image area and the second image area—specified according to a user operation from each of the captured images obtained by the input unit 201. Here, an example of a method of extracting a partial image by the extraction unit 202 will be described.

Figure 6:
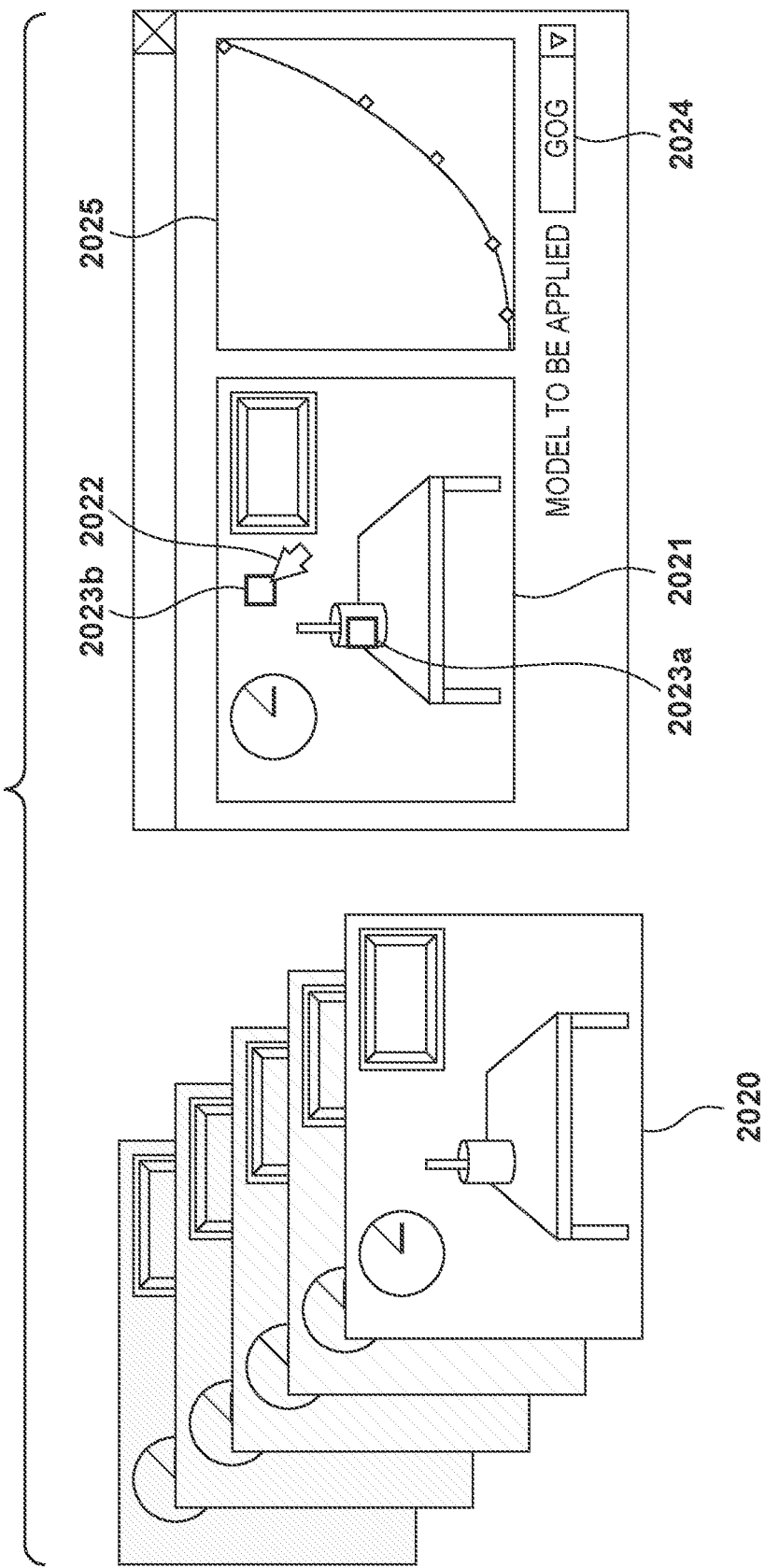
FIG. 6 is a diagram illustrating an example of a display of a GUI.

For example, the control unit 290 displays the GUI illustrated in FIG. 6 on the display screen of the display device 3. The control unit 290 sequentially displays each of a plurality of captured images 2020 obtained by the input unit 201 in the display area 2021 and receives a user operation for the captured image displayed on the display area 2021. The user operates the user interface and specifies a first image area 2023*a* and a second image area 2023*b* from which pixel values will be collected in the captured image displayed in the display area 2021. As the first image area 2023*a* and the second image area 2023*b*, in one embodiment, image areas are selected whose colors are as uniform as possible and close to gray, for example. The extraction unit 202 extracts an image in the image area specified by the above user operation for each of the captured images as a partial image. In the following, an image in the first image area is referred to as a first partial image, and an image in the second image area is referred to as a second partial image.

Figure 7:
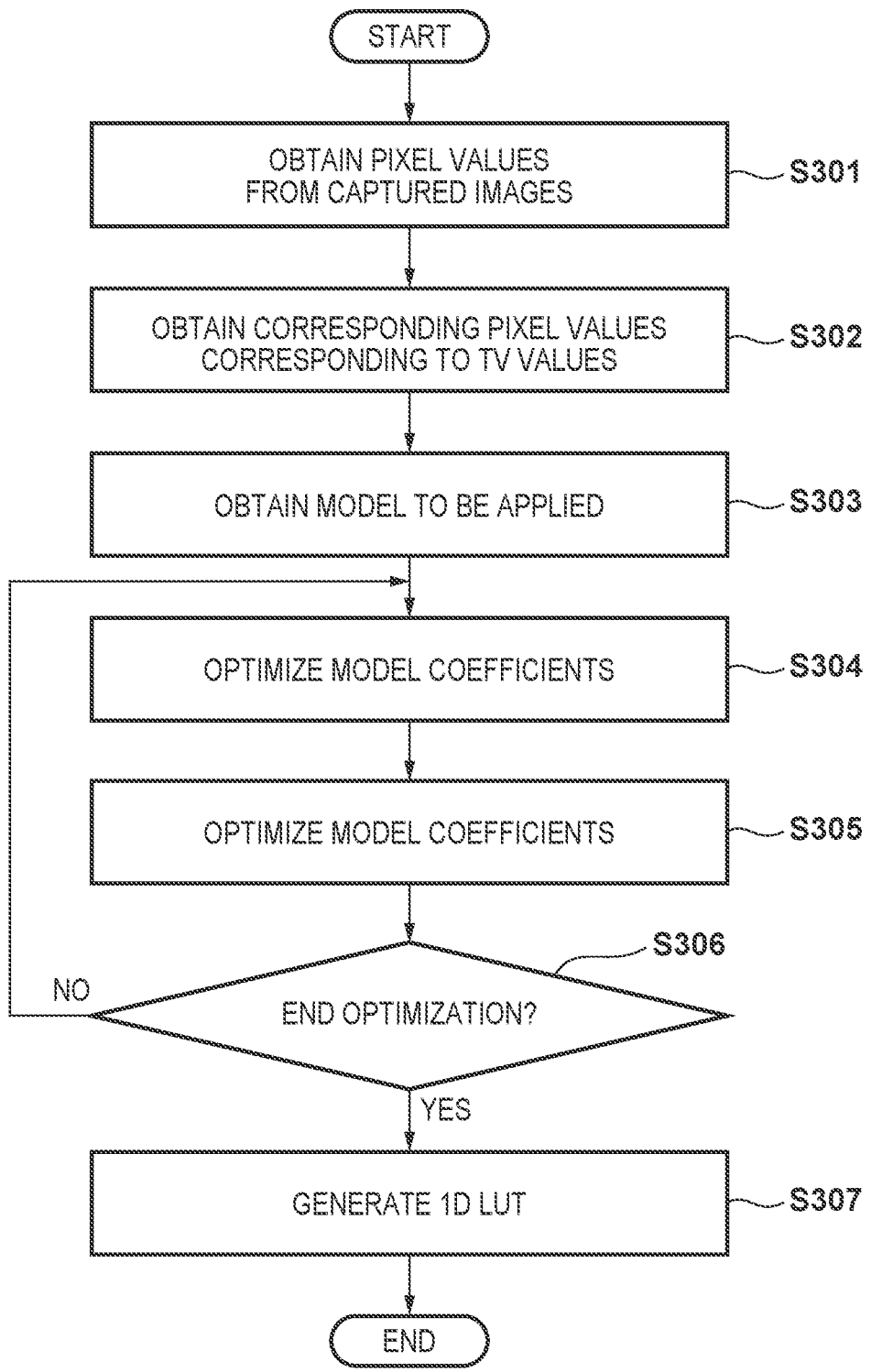
FIG. 7 is a flowchart for explaining details of the process in step S3.

Details of the processing in step S3 according to the present embodiment will be described in accordance with the flowchart of FIG. 7. In step S301, the estimation unit 203 obtains an average value Rn1 of the R pixel values, an average value Gn1 of the G pixel values, and an average value Bn1 of the B pixel values in the first partial image L1(n) extracted from the captured image I(n) by the extraction unit 202. Then, the estimation unit 203 obtains a pixel value Yn1 in the partial image L1(n) by calculating Yn1 = (3×Rn1+6×Gn1+Bn1)/10. Similarly, the estimation unit 203 obtains an average value Rn2 of the R pixel values, an average value Gn2 of the G pixel values, and an average value Bn2 of the B pixel values in the second partial image L2(n) extracted from the captured image I(n) by the extraction unit 202. Then, the estimation unit 203 obtains a pixel value Yn2 in the partial image L2(n) by calculating Yn2 = (3×Rn2+6×Gn2+Bn2)/10. By performing such processing for n=1 to N, the estimation unit 203 can obtain the pixel values of the first image area and the second image area in each of the captured images obtained by the input unit 201.

In step S302, the estimation unit 203 obtains the largest pixel value (the largest luminance value)=X00 among the pixel values Y11 to YN1 and Y12 to YN2 obtained in step S301, and a TV value=TV0 of the captured image, which is the source of extraction of the partial image from which the pixel value X00 has been obtained. Then, the estimation unit 203, obtains a corresponding pixel value=Xn0, which corresponds to a TV value=TVn of the captured image I(n), according to the following Equation (1) using the maximum pixel value=X00, the TV value=TV0, and the TV value=TVn of the captured image I(n).

$$Xn0 = X00 \times TVn/TV0 \qquad (9)$$

In step S303, the estimation unit 203 obtains a model to be applied, which is to be applied as a model for performing tone conversion (a tone conversion model), similarly to the above step S203. In step S304, the estimation unit 203 decides (optimizes) the parameters included in the model to be applied, using a data set {(X10, Y11), ..., (XN0, YN1)} similarly to the above step S204, thereby determining (optimizing) the model to be applied.

In step S305, the estimation unit 203 decides (optimizes) the parameters optimized in step S304, using a data set {(X10, Y12), ..., (XN0, YN2)} similarly to the above step S204, thereby determining (optimizing) the model to be applied.

In step S306, the estimation unit 203 determines whether a condition for ending the process (optimization process) in steps S304 and S305 is satisfied. For example, when a sum of the error ΔE obtained in step S304 and the error ΔE obtained in step S305 is equal to or less than a threshold or when the number of repetitions of the optimization process becomes equal to or greater than a threshold, the estimation unit 203 determines that the condition for ending the optimization process is satisfied. Also, for example, when a rate of change of the sum is less than a threshold, the estimation unit 203 determined that the condition for ending the optimization process is satisfied.

As a result of such a determination, when the condition for ending the optimization process is satisfied, the process proceeds to step S307, and when the condition for ending the optimization process is not satisfied, the process proceeds to step S304 and the optimization process is performed again.

In step S307, the estimation unit 203 obtains a 1D LUT using the model to be applied optimized in the optimization process of steps S304 and S305 in the same manner as in step S206 described above. The estimation unit 203 then stores the 1D LUT in the holding unit 204 as data representing the gamma characteristic of the image capturing device 1.

Third Embodiment

In the first embodiment and the second embodiment, a case where the obtained 1D LUT is used for tone conversion of an image to be inputted thereafter has been described; however, the usage of the obtained 1D LUT is not limited to a particular usage.

In the second embodiment, a case where the number of image areas to be specified in accordance with the user operation for each of the captured images is 2 has been described; however, it may be 3 or more. For example, when m image areas are specified for each captured image in accordance with a user operation, in step S301, pixel values Yn1 to Ynm are obtained for m image areas in the captured image I(n).

In step S302, the corresponding pixel value=Xn0 is obtained according to Equation (9), using the maximum pixel value=X00 among the pixel values of all the image areas, the TV value=TV0 of the captured image which is the source of extraction of the partial image from which the pixel value X00 has been obtained, and the TV value=TVn of the captured image I(n).

Then, in step S305, the process of calculating an error ΔEi is executed for i=2 to m, using Yni instead of Yn and Xn0 instead of and Xn in the above Equation (5), and then a sum of ΔE2 to ΔEm obtained by that execution is obtained as ΔE. Then, the estimation unit 203 obtains the parameter p that minimizes ΔE using the least squares method.

That is, first, a tone conversion model is optimized based on a difference between an output value in a case where a corresponding pixel value is inputted into the tone conversion model, which has been selected according to a user operation, and the pixel value of the first image area. The optimized tone conversion model is further optimized based on a difference between an output value in a case where a corresponding pixel value is inputted into the optimized tone conversion model and the pixel value of the m-th (m is an integer that is 2 or more) image area. Then, a set of an input pixel value and an output pixel value obtained by converting the input pixel value by the further optimized tone conversion model is obtained as a tone conversion characteristic.

Further, the respective functional units of the image processing device 2 illustrated in FIG. 1 may be implemented by hardware, and the respective functional units except for the holding unit 204 may be implemented by software (a computer program). In the latter case, a computer device capable of executing the computer program is applicable to the image processing device 2. An example of a hardware configuration of a computer device applicable to the image processing device 2 will be described with reference to a block diagram of FIG. 8.

A CPU 801 executes various processes using computer programs and data stored in a RAM 802 or a ROM 803. Thus, the CPU 801 controls the operation of the entire computer device and executes or controls various kinds of processing described as being performed by the image processing device 2.

The RAM 802 includes an area for storing computer programs and data loaded from the ROM 803 or the external storage device 805 and an area for storing data received from an external unit through an I/F 806. In addition, the RAM 802 has a work area that the CPU 801 uses when performing various processes. Thus, the RAM 802 can provide various areas as appropriate.

The ROM 803 stores setting data of the computer device, computer programs and data related to the start-up of the computer device, computer programs and data related to the basic operation of the computer device, and the like.

An operation unit 804 is a user interface, such as a keyboard, a mouse, and a touch panel, and the user can input various instructions to the CPU 801 by operating the operation unit 804. For example, by operating the operation unit 804, the user can perform an operation input for the GUI illustrated in FIG. 3 or the GUI illustrated in FIG. 6.

The external storage device 805 is a mass information storage device, such as a hard disk drive. The external storage device 805 stores computer programs, data, and the like for causing the CPU 801 to execute or control various processes described as being performed by the OS and the image processing device 2. The computer programs and data stored in the external storage device 805 are loaded into the RAM 802 as appropriate under the control of the CPU 801 and processed by the CPU 801. The holding unit 204 of FIG. 1 can be implemented, for example, in the RAM 802 or the external storage device 805.

The I/F 806 is a communication interface for performing data communication with an external device. For example, the computer device obtains an image captured by the image capturing device 1 and an image capturing parameter of the image capturing device 1 from the image capturing device 1 via the I/F 806 as well as outputs an image signal of the captured image and an GUI to the display device 3 via the I/F 806.

Figure 8:
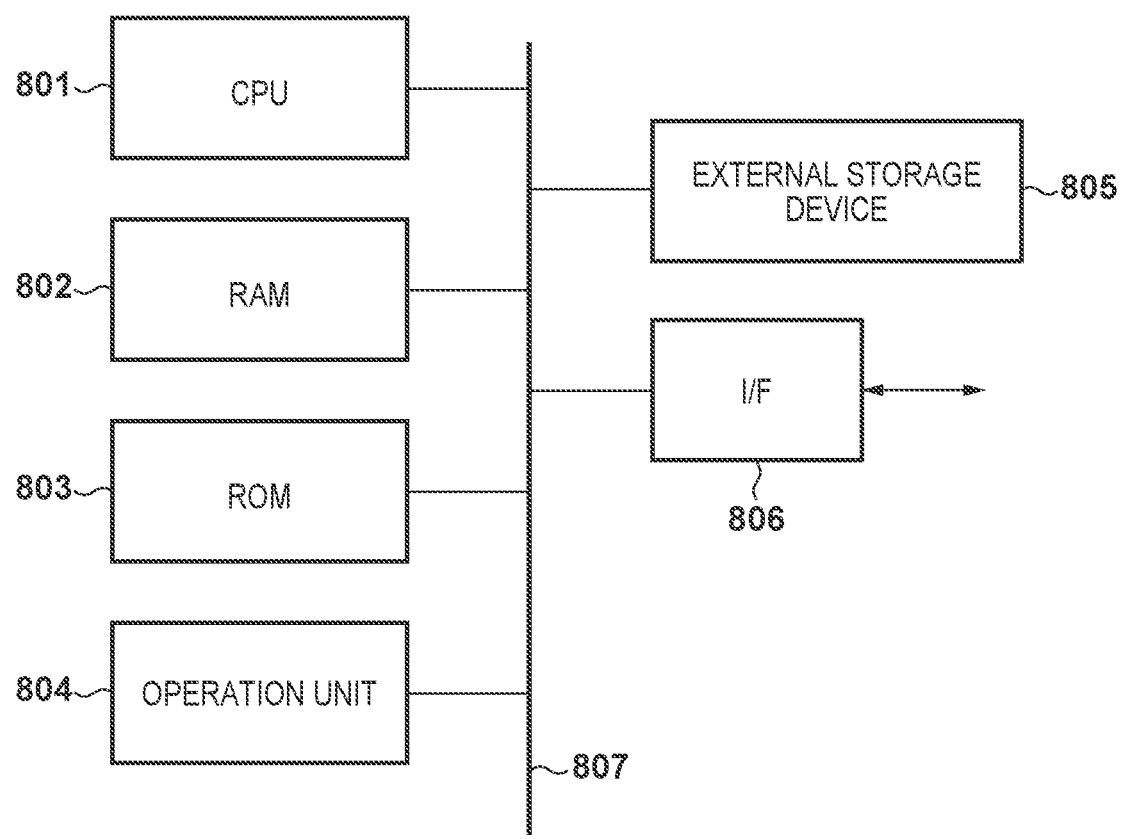
FIG. 8 is a block diagram illustrating an example of a hardware configuration of a computer device.

Each of the CPU 801, the RAM 802, the ROM 803, the operation unit 804, the external storage device 805, and the I/F 806 are connected to a system bus 807. The configuration illustrated in FIG. 8 is merely an example of a hardware configuration of a computer device applicable to the image processing device 2 and can be appropriately changed/modified.

In addition, the numerical values, processing timing, processing order, processing performer, transmission destination/transmission source/storage location of data (information), and the like used in each of the above-described embodiments are listed as examples for providing specific explanations and are not intended to limit the disclosure to such examples.

Further, some or all of the embodiments described above may be used in combination as appropriate. Further, some or all of the variations of the embodiments described above may be used selectively.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-185893, filed Nov. 15, 2021, which is hereby incorporated by reference herein in its entirety.

What is claimed is:

1. A processing device comprising:
   at least one processor; and
   a memory coupled to the at least one processor, the memory having instructions that, when executed by the processor, causes the at least one processor to function as:
   a processing unit configured to derive pixel values corresponding to respective parameters based on a pixel value of one captured image among a plurality of images captured by a capturing device with different parameters and a parameter corresponding to a respective one of the plurality of captured images; and
   an obtainment unit configured to obtain a characteristic in the capturing device based on a pixel value of respective one of the plurality of captured images and the derived pixel values,
   wherein the parameter includes a shutter speed of the capturing device, an aperture value of the capturing device, or a sensitivity of the capturing device, and
   wherein the processing unit derives the pixel values corresponding to the respective parameters based on a pixel value in a captured image whose pixel value is the largest among the plurality of captured images and the parameter corresponding to the respective one of the plurality of captured images.

2. The processing device according to claim 1, wherein the obtainment unit optimizes a model that has been selected according to a user operation, based on a difference between an output value in a case where the corresponding pixel value has been inputted into the model and a pixel value in the respective one of the plurality of captured images, and obtains as a characteristic a set of an input pixel value and an output pixel value obtained by converting the input pixel value by the optimized model.

3. The processing device according to claim 2, wherein the model includes a GOG model and a LOG gamma model.

4. The processing device according to claim 1, wherein the processing unit derives the pixel values corresponding to the respective parameters based on pixel values of a plurality of areas in the plurality of captured images and the parameter corresponding to the respective one of the plurality of captured images.

5. The processing device according to claim 4, wherein the obtainment unit optimizes a model that has been selected according to a user operation, based on a difference between an output value in a case where the pixel value has been inputted into the model and a pixel value of a first area, further optimizes the optimized model based on a difference between an output value in a case where the pixel value has been inputted into the optimized model and a pixel value of an m-th (m is an integer that is 2 or more) area, and obtains as a characteristic a set of an input pixel value and an output pixel value obtained by converting the input pixel value by the further optimized model.

6. The processing device according to claim 1, further comprising a display configured to display on a display screen a curve representing the characteristic.

7. A processing method performed by a processing device, the method comprising:
   deriving pixel values corresponding to respective parameters based on a pixel value of one captured image among a plurality of images captured by a capturing device with different parameters and a parameter corresponding to a respective one of the plurality of captured images; and
   obtaining a characteristic in the capturing device based on a pixel value of respective one of the plurality of captured images and the derived corresponding pixel values,
   wherein the parameter includes a shutter speed of the capturing device, an aperture value of the capturing device, or a sensitivity of the capturing device, and
   wherein the deriving derives the pixel values corresponding to the respective parameters based on a pixel value in a captured image whose pixel value is the largest among the plurality of captured images and the parameter corresponding to the respective one of the plurality of captured images.

8. The processing method according to claim 7, wherein the obtaining optimizes a model that has been selected according to a user operation, based on a difference between an output value in a case where the corresponding pixel value has been inputted into the model and a pixel value in the respective one of the plurality of captured images, and obtains as a characteristic a set of an input pixel value and an output pixel value obtained by converting the input pixel value by the optimized model.

9. The processing method according to claim 7, wherein the deriving derives the pixel values corresponding to the respective parameters based on pixel values of a plurality of areas in the plurality of captured images and the parameter corresponding to the respective one of the plurality of captured images.

10. The processing method according to claim 7, further comprising displaying on a display screen a curve representing the characteristic.

11. The processing method according to claim 7, wherein the parameter includes a shutter speed of the capturing device, an aperture value of the capturing device, and a sensitivity of the capturing device.

12. A non-transitory computer-readable storage medium storing a computer program causing a computer to execute a method comprising:
deriving pixel values corresponding to respective parameters based on a pixel value of one captured image among a plurality of images captured by a capturing device with different parameters and a parameter corresponding to a respective one of the plurality of captured images; and
obtaining characteristic in the capturing device based on a pixel value of respective one of the plurality of captured images and the derived corresponding pixel values,
wherein the parameter includes a shutter speed of the capturing device, an aperture value of the capturing device, or a sensitivity of the capturing device, and
wherein the deriving derives the pixel values corresponding to the respective parameters based on a pixel value in a captured image whose pixel value is the largest among the plurality of captured images and the parameter corresponding to the respective one of the plurality of captured images.

13. The non-transitory computer-readable storage medium according to claim 12, wherein the obtaining optimizes a model that has been selected according to a user operation, based on a difference between an output value in a case where the corresponding pixel value has been inputted into the model and a pixel value in the respective one of the plurality of captured images, and obtains as a characteristic a set of an input pixel value and an output pixel value obtained by converting the input pixel value by the optimized model.

14. The non-transitory computer-readable storage medium according to claim 12, wherein the deriving derives the pixel values corresponding to the respective parameters based on pixel values of a plurality of areas in the plurality of captured images and the parameter corresponding to the respective one of the plurality of captured images.

15. The non-transitory computer-readable storage medium according to claim 12, further comprising displaying on a display screen a curve representing the characteristic.

16. The non-transitory computer-readable storage medium according to claim 12, wherein the parameter includes a shutter speed of the capturing device, an aperture value of the capturing device, and a sensitivity of the capturing device.

* * * * *